United States Patent [19]

Schmutz

[11] Patent Number: 5,629,765
[45] Date of Patent: May 13, 1997

[54] WAVEFRONT MEASURING SYSTEM WITH INTEGRAL GEOMETRIC REFERENCE (IGR)

[75] Inventor: Lawrence E. Schmutz, Watertown, Mass.

[73] Assignee: Adaptive Optics Associates, Inc., Cambridge, Mass.

[21] Appl. No.: 572,907

[22] Filed: Dec. 15, 1995

[51] Int. Cl.$^6$ .................................................. G01J 1/20
[52] U.S. Cl. ................................... 356/121; 250/201.9
[58] Field of Search .................................... 356/121, 122, 356/123, 354; 250/201.9; 359/291, 294

[56] References Cited

U.S. PATENT DOCUMENTS

| H615 | 4/1989 | Feinleib et al. | 356/121 |
|---|---|---|---|
| 4,141,652 | 2/1979 | Feinleib | 356/121 |
| 4,399,356 | 8/1983 | Feinleib et al. | 356/121 |
| 4,472,029 | 9/1984 | Hardy | 250/201.9 |
| 4,490,039 | 12/1984 | Bruckler et al. | 356/121 |
| 4,518,854 | 5/1985 | Hutchin | 250/201.9 |
| 4,725,138 | 2/1988 | Wirth et al. | 356/121 |
| 4,737,621 | 4/1988 | Gonsiorowski et al. | 356/121 |
| 5,083,015 | 1/1992 | Witthoft et al. | 250/201.9 |
| 5,164,578 | 11/1992 | Witthoft et al. | 356/121 |
| 5,233,174 | 8/1993 | Zmek | 250/201.9 |
| 5,270,859 | 12/1993 | Wirth et al. | 359/622 |
| 5,287,165 | 2/1994 | Ulich et al. | 356/121 |

*Primary Examiner*—Hoa Q. Pham
*Attorney, Agent, or Firm*—Dominic J. Chiantera

[57] ABSTRACT

A geometric sensor includes a Monolithic Lenslet Module (MLM) subaperture array having a plurality of microlenses, each of which have an opaque center formed concentric with the microlens optical axis, at the location of the lens chief ray, to produce an integral geometric reference (IGR) spot pattern of the lens array which is used to correct for sensor errors to an accuracy comparable with that achieved with reference plane wave calibration.

3 Claims, 6 Drawing Sheets

WAVEFRONT MEASURING SYSTEM WITH INTEGRAL GEOMETRIC REFERENCE (IGR)

DESCRIPTION

1. Technical Field

This invention relates to wavefront measuring systems, and more particularly to geometric type wavefront sensors.

2. Background Art

There are a number of known adaptive optics applications which require the measurement of wavefront distortion in light received from a viewed object. These include optical correction systems in which the conjugate of the sensed distortion drives a deformable mirror in the received wavefront's optical path to provide real time image compensation, and measurement systems which provide non-real time measurement of the optical quality of a laser beam or a manufactured optical component. Each application measures the wavefront phase profile with a wavefront sensor. Two known types of sensor configurations include the interferometric sensor, such as the Twyman-Green, Fizeau, and shearing interferometer sensors, and the geometric type, such as the Hartmann-Shack sensor.

In an interferometric sensor a wavefront is measured by coherently adding it to a mutually coherent plane wavefront and measuring the spatial distribution of the intensity variations in the resultant combined wavefront. For example, in a Twyman-Green sensor, a single plane coherent wavefront, prepared using a frequency stabilized laser and precision collimating optics, is split into two components using an optically flat beam splitter. One component is directed onto an optical component under test, such as a flat mirror which is being tested after manufacture, and the reflected wavefront is recombined with the remainder of the original wavefront using the same beam splitter that first divided it. The combined beams then impinge upon a flat diffusely scattering surface, such as a screen or diffuser, or onto a two-dimensional detector array, such as a charge coupled device (CCD), creating an interference pattern. Any aberrations in the mirror under test cause deviations in the interference pattern, which can be measured and mathematically analyzed to yield a quantitative description of the profile of the test mirror. The key to accuracy here is the generation of a truly plane, phase coherent plane wave with which the testing can be performed.

The interferometric sensor's complex structure limits their accurate use to environments which are relatively free of vibration, air motion, and sharp temperature variations. Without these control conditions the contrast in the interference fringes used in the technique is reduced; reducing the base accuracy of the sensor. Similarly, calibration of an interferometric sensor requires the use of high quality, stable frequency, laser-generated plane wave, together with precisely made reference mirrors, collimating lenses and beam combiners. Their sensitivity and costly calibration optics principally limit the use of interferometric sensors to laboratory applications.

Alteratively, geometric sensors, such as that disclosed by Julius M. Feinleib in U.S. Pat. No. 4,141,652, are more rugged and provide measurement accuracies that compare favorably with interferometric sensors. The geometric sensor divides the full aperture input wavefront into plural subaperture images with an array of small diameter lenses. The subaperture images are focused as a two dimensional spot pattern onto a photodetector array which provides the X-Y phase gradient of each spot image as a representation of the average tip/tilt of each subaperture segment. Each segment phase gradient is converted to a phase estimate by a microprocessor-based reconstruction algorithm and the sum of the phase estimates provides a reconstruction of the wavefront's full aperture phase profile. Measurement inaccuracies due to optical distortion or misalignment of the sensor's optics are minimized by combining the received wavefront with an internal reference laser wavefront upstream of the subaperture optics and measuring subaperture tilt/tip as the difference spot position between the two waves. Since the reference wave suffers no atmospheric distortion, any displacement of the reference wave's subaperture spot position from that of the subaperture's chief ray is attributable to sensor distortion. The differential spot position between the two waves, therefore, provides an accurate measure of the received wavefront's distortion.

The geometric sensor is more tolerant of vibration and temperature conditions which, together with its simplicity, allows it to be used in a greater number of adaptive optic applications outside of the laboratory. However, prior art geometric sensors also require a high quality calibration standard in the form of an accurate plane wave laser and collimating optics, as in the sensor configuration disclosed by Julius N. Feinleib and Lawrence E. Schmutz in statutory invention registration (SIR) H615 (see 35 U.S.C. 157) entitled: *High Speed/Low Light Wavefront Sensor System* (Apr. 4, 1989).

Referring to FIG. 1 of H615, as reproduced herein, the received wavefront (or target beam) 4 is combined with a reference light beam from reference laser 1 in beam combiner 5. The combined beams are presented alternately, through optical switching means, through foreoptics 6 to a subaperture lens array 7, which produces the subaperture spot pattern that is intensified in image intensifier 8 and presented to a photodetector array 9. The phase gradient data from the detector is then reconstructed into the target beam phase profile by the system's signal processor 10.

The H615 subaperture lens array is a Monolithic Lenslet Module (MLM) of the type manufactured by Adaptive Optics Associates, Inc.(AOA), Cambridge, Mass. The MLM is a precision array of plural refractive microlenses formed in a monolithic optical substrate. The prior art FIG. 2 herein is a reproduction of the H615 SIR FIG. 2 which depicts, in simplified schematic form, the operation of MLM 7. As recited in H615, at column 5, lines 7 et seq:

In the diagram of FIG. 2, the incoming wavefront having a phase distribution $\phi(x,y)$ impinges on a two-dimensional array of lenses which is located at a pupil plane of the optical system. This lens array is referred to as a Monolithic Lenslet Module, or MLM. Each lens in the MLM intercepts a small segment, or subaperture, of the full system aperture. a 2D array of spots, each spot corresponding to one subaperture, is thereby formed behind the MLM at the lens focal length F. Each spot is an image of the source illumination or target. For a perfectly flat, tilt-free plane wave ($\phi(x,y)$=constant), all spots will fall directly on the optical axis of their subapertures. For an aberrated wavefront, each spot is displaced from its nominal position by an amount $r(x,y)$, where $r$ is given by: $r(x,y)=F\ g(x,y)$ and $g(x,y)$ is the gradient of the phase distribution: $g(x,y)=\phi(x,y)$.

The H615 sensor, requires use of a reference plane wave having $\phi(x,y)$=constant, which is provided by the laser source 1 and beam combiner optics 5 (FIG. 1) to establish a reference spot pattern whose spot locations are recorded by processor 10 and subtracted from the target beam spots to remove the sensor's optical and electronic systematic errors. However, the reference plane wave signal source and collimating optics must be of high quality, and add significantly to the sensor's cost.

There exists, therefore, a need for a lower cost, acceptable accuracy geometric wavefront sensor which does not require a plane wave reference to maintain its accuracy during ordinary operation.

DISCLOSURE OF INVENTION

One object of the present invention is to provide an improved geometric wavefront sensor having sensed accuracy equal to prior art geometric sensors but with a simpler configuration and lower cost.

According to the present invention, a geometric sensor includes a Monolithic Lenslet Module (MLM) which incorporates a reference spot pattern, or integral geometric reference, within the MLM array itself by providing each microlens with a substantially opaque center portion; each opaque element, referred to as a reference fiducial point, is precisely positioned concentric with the lens optical axis, at the location of the lens chief ray, whereby the aggregate of the fiducial points produce an integral geometric reference spot pattern which is equivalent to the spot produced by an ideal plane wavefront signal.

In further accord with the present invention, the geometric sensor further comprises a combination lens and photodetector assembly which is alternately positioned at different locations along the beam path of the subaperture images, from the MLM pupil plane to the MLM focal plane, to allow the detector to alternately record both the focused subaperture spot pattern of the focal plane and also the internal geometric reference spot pattern of fiducial points in the MLM pupil plane, thereby allowing for comparison of the two spot patterns to determine subaperture phase gradient.

The geometric sensor of the present invention provides an accurate internal calibration standard in the form of an internal geometric reference which may be incorporated within the sensor subaperture MLM array, thereby eliminating the cost and complexity associated with a reference wave calibration standard.

These and other objects, features, and advantages of the present invention will become more apparent in light of the following detailed description of a best mode embodiment thereof, as illustrated in the accompanying Drawing.

BEST MODE FOR CARRYING OUT THE INVENTION

Figure 1:
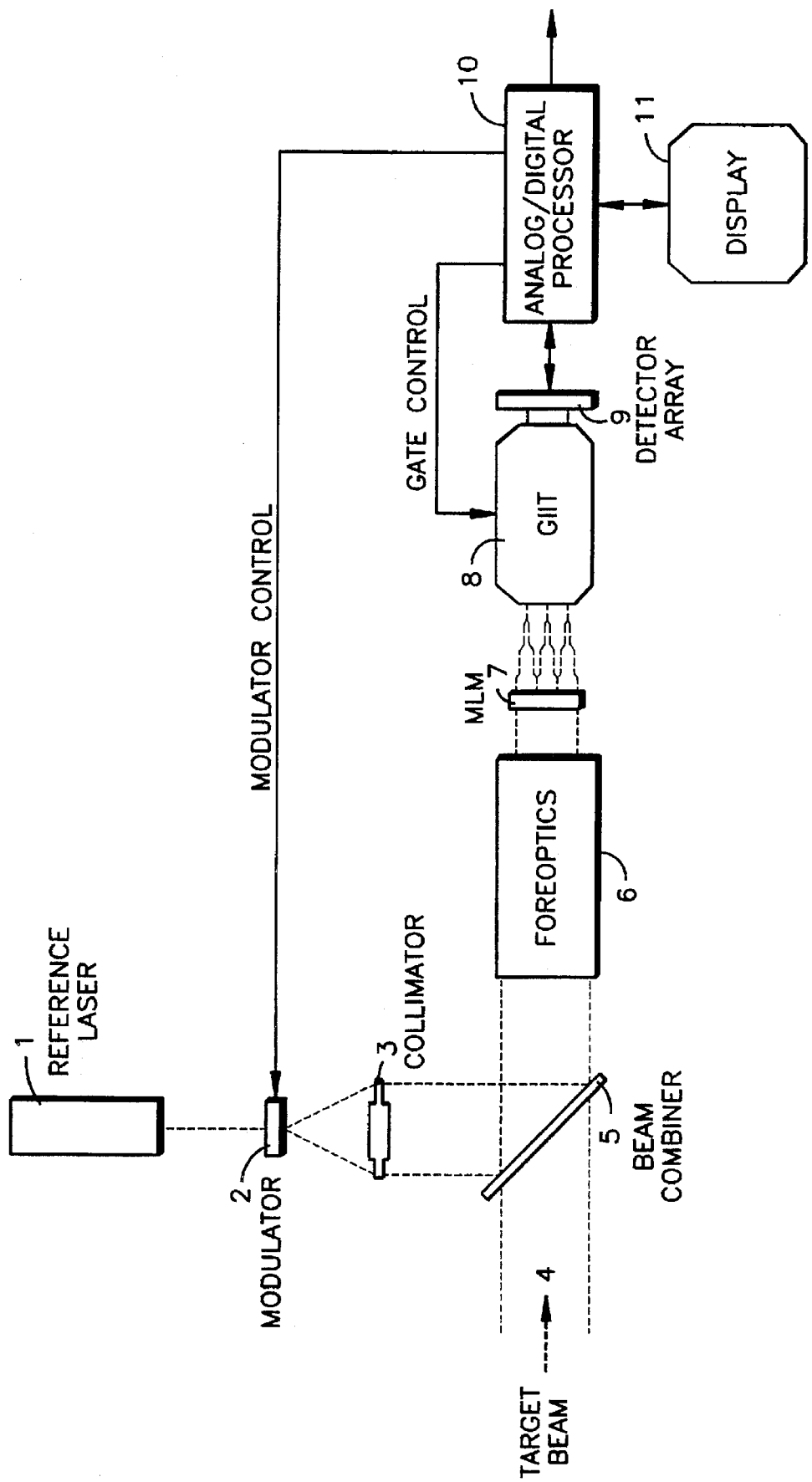
FIG. 1, is a reproduction of the prior art FIG. 1 of statutory invention registration (SIR) H615 entitled: *High Speed/Low Light Wavefront Sensor System* (Apr. 4, 1989)
Figure 2:
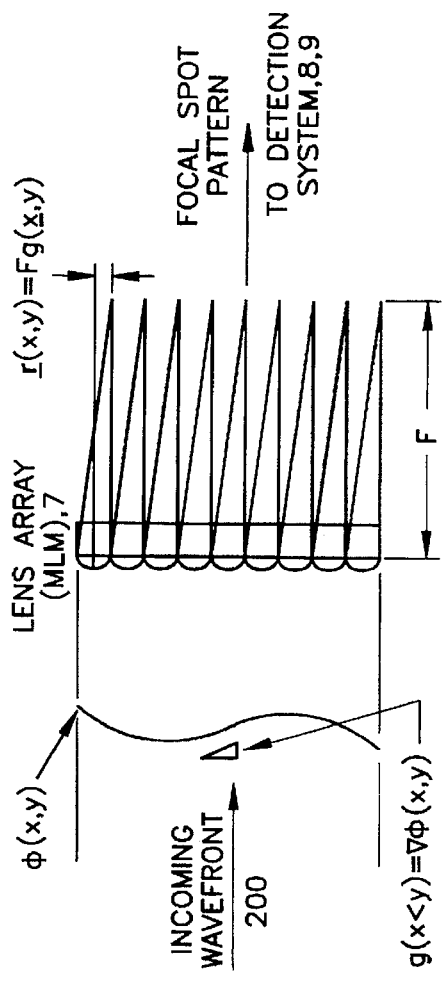
FIG. 2 is a reproduction of the prior art FIG. 2 of SIR H615.
Figure 3:
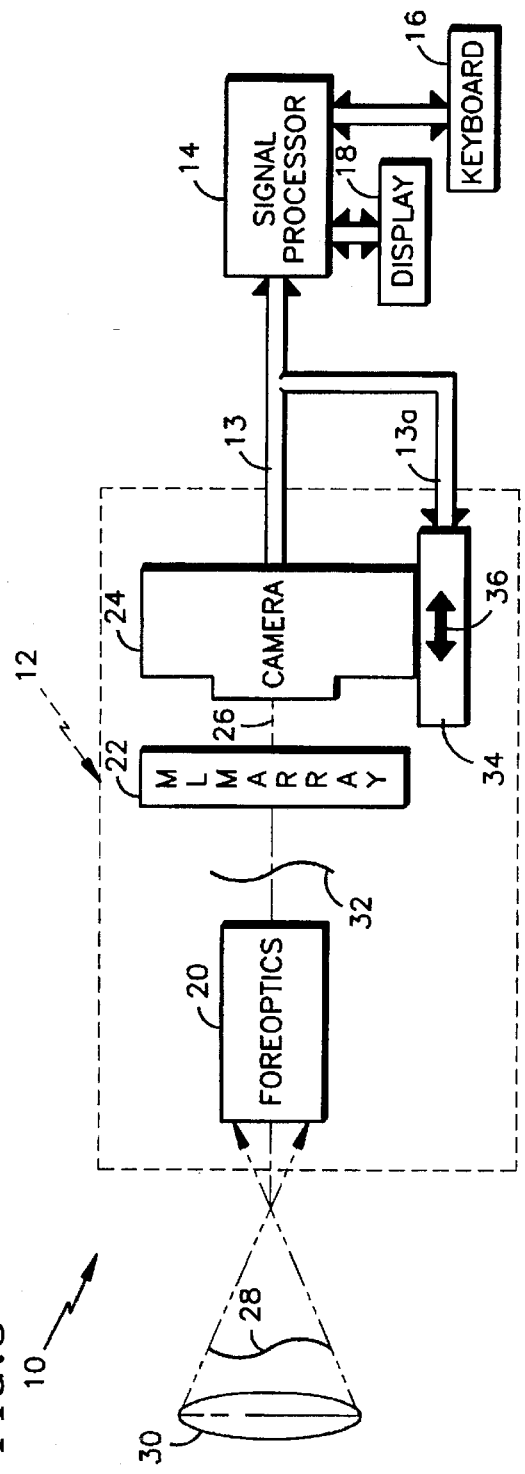
FIG. 3 is a system block diagram of a best mode embodiment of a wavefront sensor system according to the present invention.

Referring to FIG. 3, the wavefront sensor system 10 of the present invention includes a geometric sensor 12, connected through lines 13, 13a to a system signal processor 14. The signal processor, which may be a commercially available, DOS based PC with an INTEL® PENTIUM® microprocessor, includes a standard full keyset keyboard 16 and a display 18. The display is a standard SVGA monitor with a 256 color video driver.

In the best mode embodiment, the sensor 12 includes foreoptics 20, a Monolithic Lenslet Module subaperture lens array 22, and a camera 24; successively positioned along the sensor's optical axis 26. As in prior art geometric sensors, the foreoptics 20 relays the received wavefront 28 of an optic under test 30 as a smaller radial scale, full aperture image 32 to the subaperture MLM array 22. Similarly, the MLM array 22 divides the image 32 into plural subaperture images which are presented to the camera 24. As described in detail hereinafter, the camera 24 is mounted on a movable platform 34 which moves in reciprocal fashion along a path 36; substantially parallel to the sensor's optical axis 26. The system signal processor 14 controls the position of the platform 34 on the path 36 through lines 13.

Figure 4:
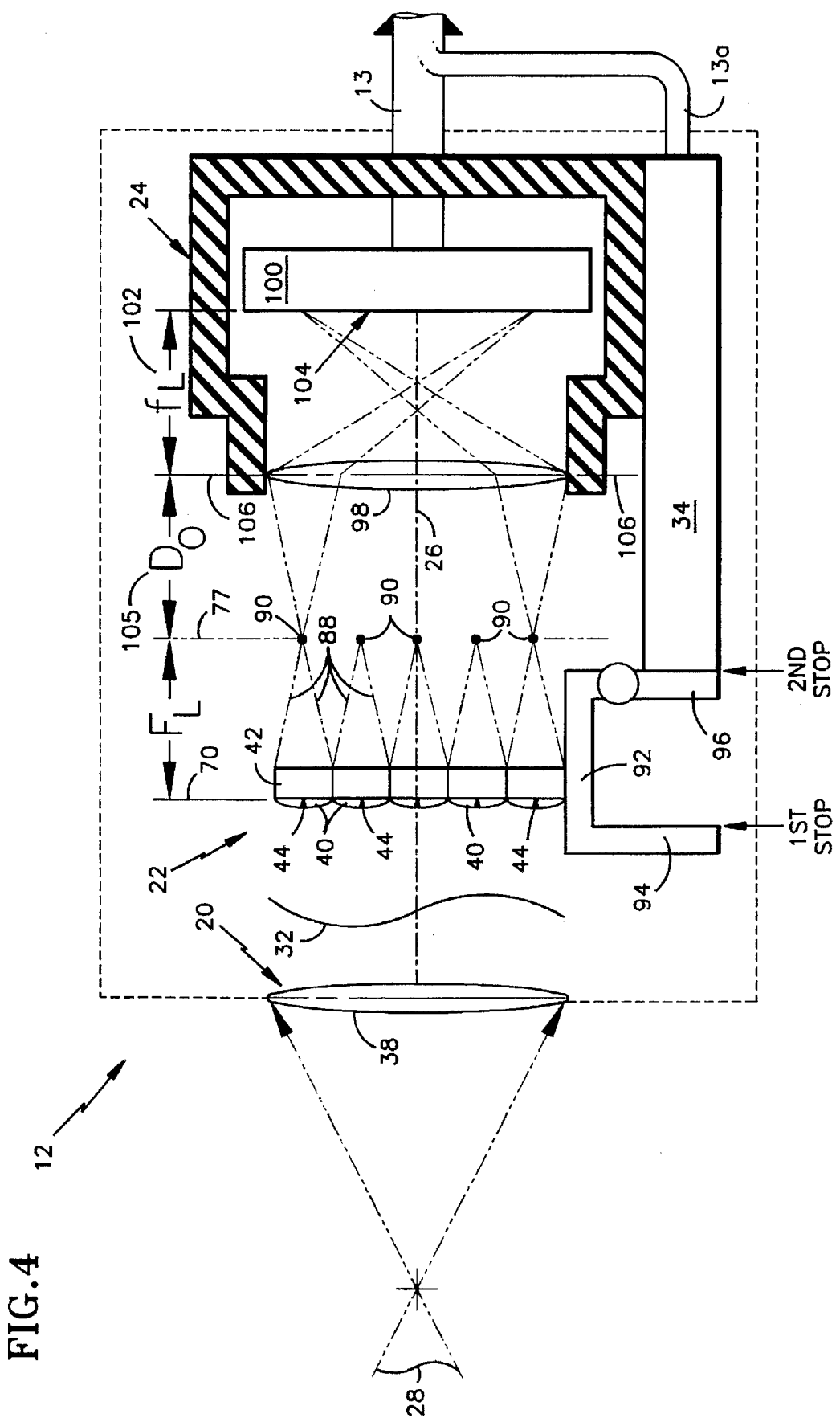
FIG. 4 is a schematic block diagram illustrating one element of the sensor system of FIG. 3.

Referring now to FIG. 4, in a schematic illustration of the sensor 12, the foreoptics 20 comprises a standard doublet lens 38 for collimating the received wavefront 28 of the optic under test into the scaled full aperture image 32. Typically the lens 38 would have what is known to those skilled in the art as "best form" for laser collimation.

Alternatively, as also understood by those skilled in the art, the incorporation of foreoptics 20 in the sensor configuration is optional. They may be eliminated in applications in which the sensor's host measurement system itself provides an acceptable, scaled full aperture image directly to the MLM 22.

The MLM 22 array is similar in type to prior art MLMs manufactured by Adaptive Optics Associates, Inc. (AOA) in that it comprises a precision array of plural refractive microlenses 40, formed contiguously on a monolithic optical substrate 42. The microlenses 40 are typically compression molded of polymethymethacrylate (PMMA) plastic. They are positioned in the substrate 42 with full edge-to-edge lenslet contact to maximize the MLM density of lens area to total surface area (referred to as "fill factor"). The fill factor determines how much of the scaled full aperture image 32 is captured in subaperture images, and the commercial MLMs manufactured by AOA have fill factors exceeding 98 percent.

The MLM 22 of the present sensor is novel, however, in that it produces a reference spot pattern, or integral geometric reference, within the lens array itself. The integral geometric reference (or IGR) is achieved by incorporating a substantially opaque element 44 at the center of each microlens of the MLM. The opaque element 44, referred to as a reference fiducial point, or "fiducial" is accurately positioned at the optical axis of each microlens, at the location of lens chief ray. The fiducial surface area is relative to the microlens clear aperture diameter, which varies with the particular sensor application. It must be large enough to provide a suitable intensity IGR spot image to the detector but small enough to have minimal affect on the lens subaperture image. Depending on the particular sensor application, the fiducial area may range from 5% to 20% of the microlens surface area.

Figure 5:
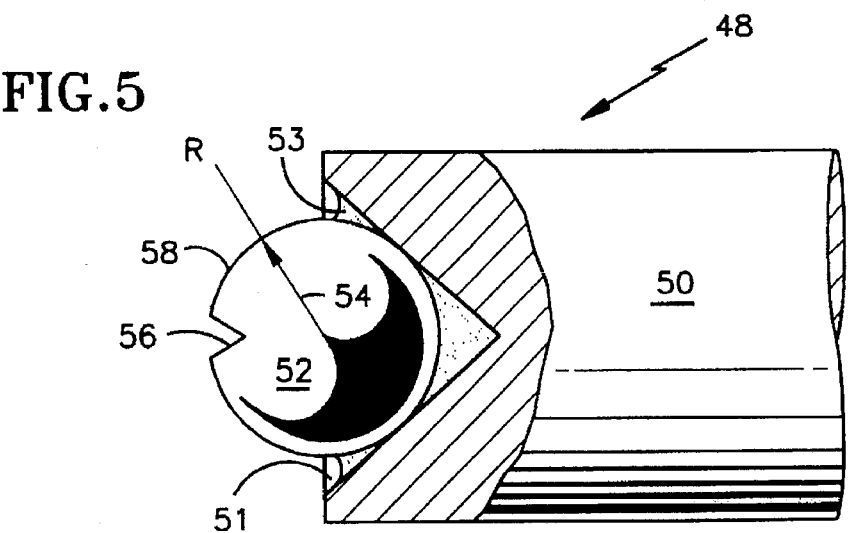
FIG. 5 is a partial plan view of tooling used in the manufacture of a component of the embodiment of FIG. 4.

The AOA fabrication techniques for the MLM maintains an accurate, constant relationship between the position of the fiducial element 44 and the microlens true optical axis 26 (chief ray location). This is achieved with extremely high repeatability using a step-and-repeat method for creating an MLM tooling master which incorporates the fiducial elements in the lenslet mold. FIG. 5 illustrates a portion of the manufacturing tooling used to create the internal geometric reference MLM.

Referring to FIG. 5, a tool stylus 48 includes a shaft 50 having a conical seat 51 at one end of the shaft. An embossing die 52 is mounted in the seat 51 and secured with a known type cement 53, such as cyanoacrylate. The die 52 may be a highly polished, spherical ball having a radius R 54, which establishes the curvature radius of the MLM lenslets, and incorporating the fiducial indent 56 in the lenslet surface profile 58. The indent 56 may be formed in the surface of the die 52 by a number of alterative methods, including mechanical or laser drilling, or spark cutting. The exact method used depends on the embossing die material.

Figure 6:
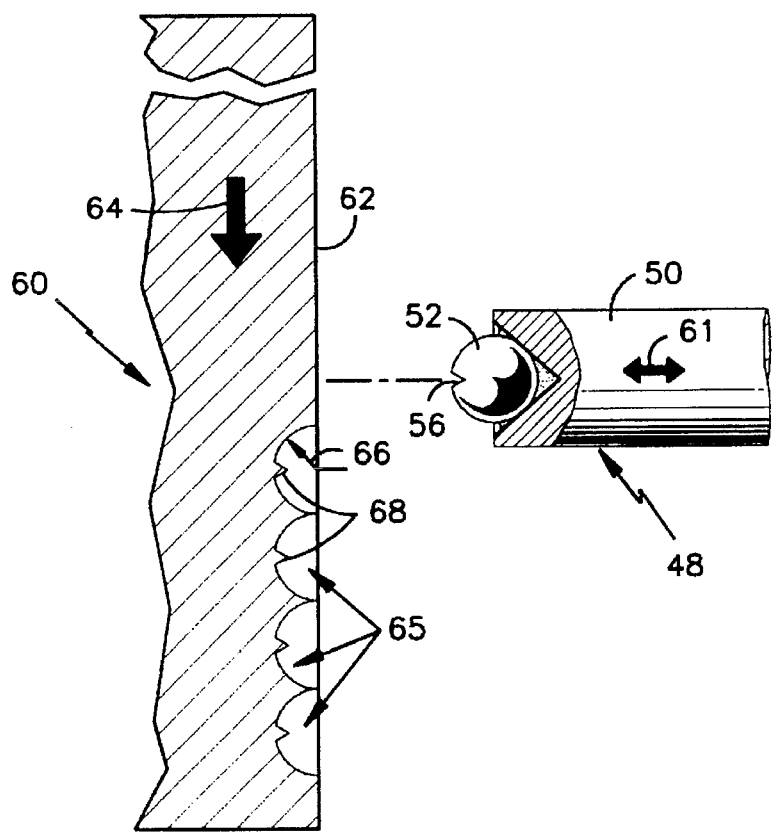
FIG. 6 is an illustration of the operation of the tooling of FIG. 5.

FIG. 6 is a figurative illustration of the tool 48 being used to emboss the microlens surface 58 of the die 52 into an MLM tooling master 60. As known, the MLMs are formed by using a tooling master die to compression mold optical substrate materials, such as optical plastic, to form the microlens array. The stylus is installed in a step-and-repeat engine (not shown) which reciprocates (arrow 61) the shaft 50 to allow the die 52 to repeatedly impact succeeding points on the surface 62 of the tooling master mold 60 as it moves in a direction 64 transverse to the die 52. The master comprises a malleable material. Each die impact embosses the tooling surface 62 to replicate the die radius 54 and fiducial detent 56 (FIG. 5) in the surface 62. The step and repeat process permits the formation of identical, successively arrayed, lenslet impressions 65, each with a radius 66 and fiducial indent 68 identical to those of the die 52. It should be noted that although the lenslets may not be located accurately in the tooling due to errors in positioning during the step-and-repeat process, the spatial relationship between the fiducial and the optical axes of the lenslets is perfectly preserved, because this relationship is built into the stylus.

Figure 7:
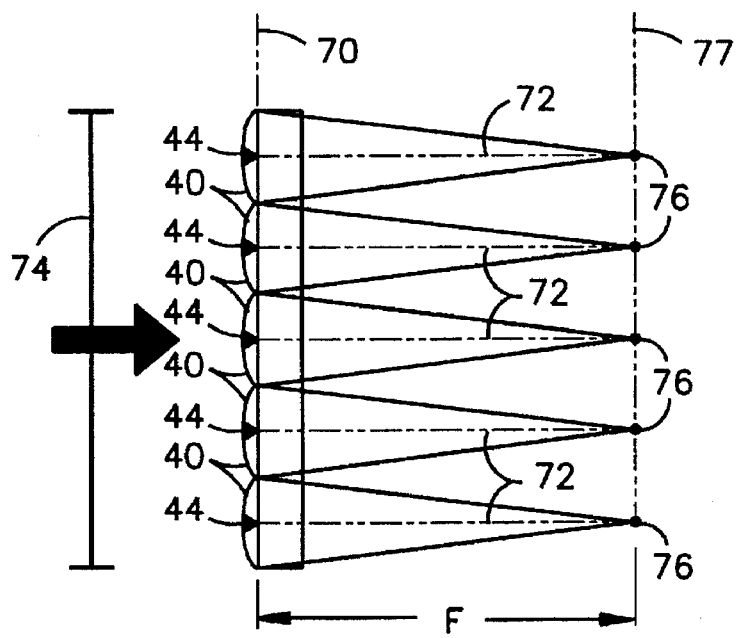
FIG. 7 is an illustration used in a description of the operation of the embodiment of FIG. 4.

Referring now to FIG. 7, in a sectioned, schematic view of the MLM 22, the array of microlenses 40 are positioned in the pupil plane 70 of the MLM, together with the fiducials 44 which are positioned concentric to the optical axes 72 of the lenses. Upon incidence of a tilt free plane wave 74 ($\phi(x,y)$=constant) the MLM array focuses the plane wave subaperture images to spot images 76 in the MLM focal plane 77. The plane wave spot images coincide with the lenslet optical axes 72 (i.e. each lenslet's chief ray) such that the pattern of the plane wave's spot images exactly coincides with the pattern of the internal geometric reference provided by the fiducials 44.

Figure 8:
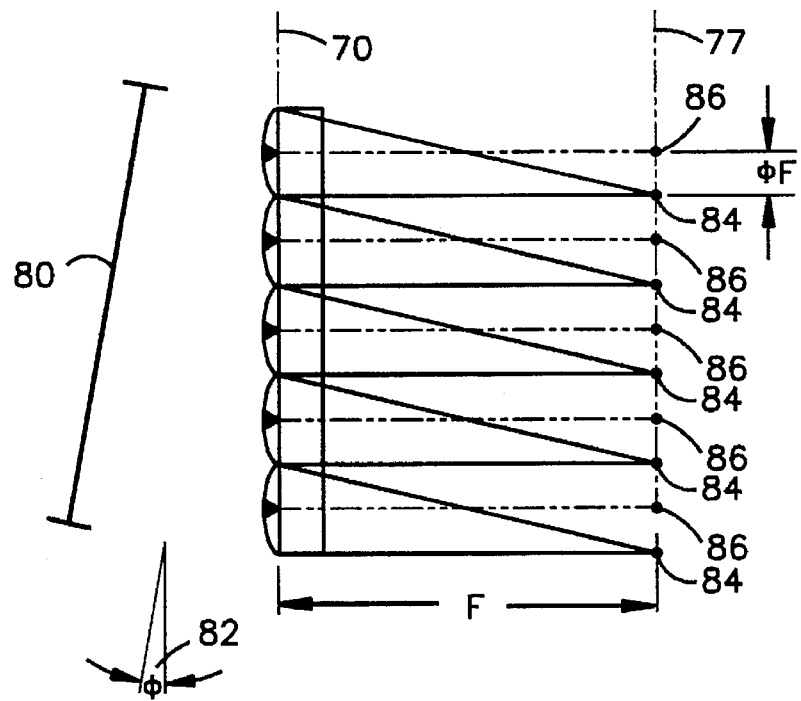
FIG. 8 is another illustration used in conjunction with FIG. 7 in describing the operation of the embodiment of FIG. 4.

Alternatively, FIG. 8 illustrates a plane wave 80 which is incident at an angle $\theta$. The resulting pattern of subaperture spots 84 in the focal plane 77 has the same pattern as that of the fiducial spot images 86, but the two patterns are displaced by a constant distance $\theta F$, where $\theta$ is the angle of incidence and F is the MLM focal length. The image of the fiducial spots is therefore equivalent to the external reference wave, to within a correction for full aperture tilt ($\theta F$).

Referring back to FIG. 4, the MLM 22 focuses the ray bundles 88 of each subaperture image to a pattern of spots 90 in the MLM focal plane 77. Since fundamental accuracy of the geometric sensor depends on the accuracy to which the quantities xl and yl (the locations of the subaperture lenslet centers), $\Delta x$ and $\Delta y$ (the displacements of the subaperture image spots from the lenslet optical axis), and F (the focal length or pupil-to-focal plane distance) can be maintained, the MLM 22 is mounted in a stable mechanical structure 92 which includes two mechanical stops 96, 94, which are spaced apart at a distance equal to the MLM pupil plane to focal plane distance.

The camera 124 includes a relay lens 98 and a photodetector array 100. The camera is fixedly mounted to the camera platform 34. The platform 34 is a single-axis movable stage, such as a dovetail, which permits only uniaxial motion, or a crossed roller beating stage, which like a dovetail permits only uniaxial motion but with a low friction bearing configuration. This permits the camera 124 to focus in several different image planes along the subaperture beam path, in a manner similar to the geometric measurement system disclosed in a published article entitled: *Applying Hartmann Wavefront Sensing Technology to Precision Optical Testing Of the Hubble Space Telescope Correctors*, by L. Bruno, A. Wirth, and A. J. Jankevics, PROCEEDINGS OF THE SPIE, San Diego, 1993.

The camera may be a standard RS-170 type monochrome video camera, such as those manufactured by PULNIX, Inc. or COHU, Inc., however, such other known model cameras may be used as may be deemed suitable for use by those skilled in the art. As described hereinafter, in the; best mode embodiment the camera is positioned at fixed stops along the subaperture beam path. It may be moved or retracted by any suitable means, including manual positioning by an operator if permitted by the time constraints of the particular application. Alternatively, the pre-stops may be eliminated and the platform can be motorized with a stepper motor drive. The particular means of actuation is necessarily determined on an application basis.

The lens 98 is fixed within the camera at its focal length ($f_L$) 102 from the detector 100 receiving surface 104. The camera 124 is also fixed in position on the platform 34 so as to position the relay lens 98 at its object distance ($D_o$) 105 from the MLM focal plane 77 when the platform 34 is positioned against the engaged second stop 96.

Figure 9:
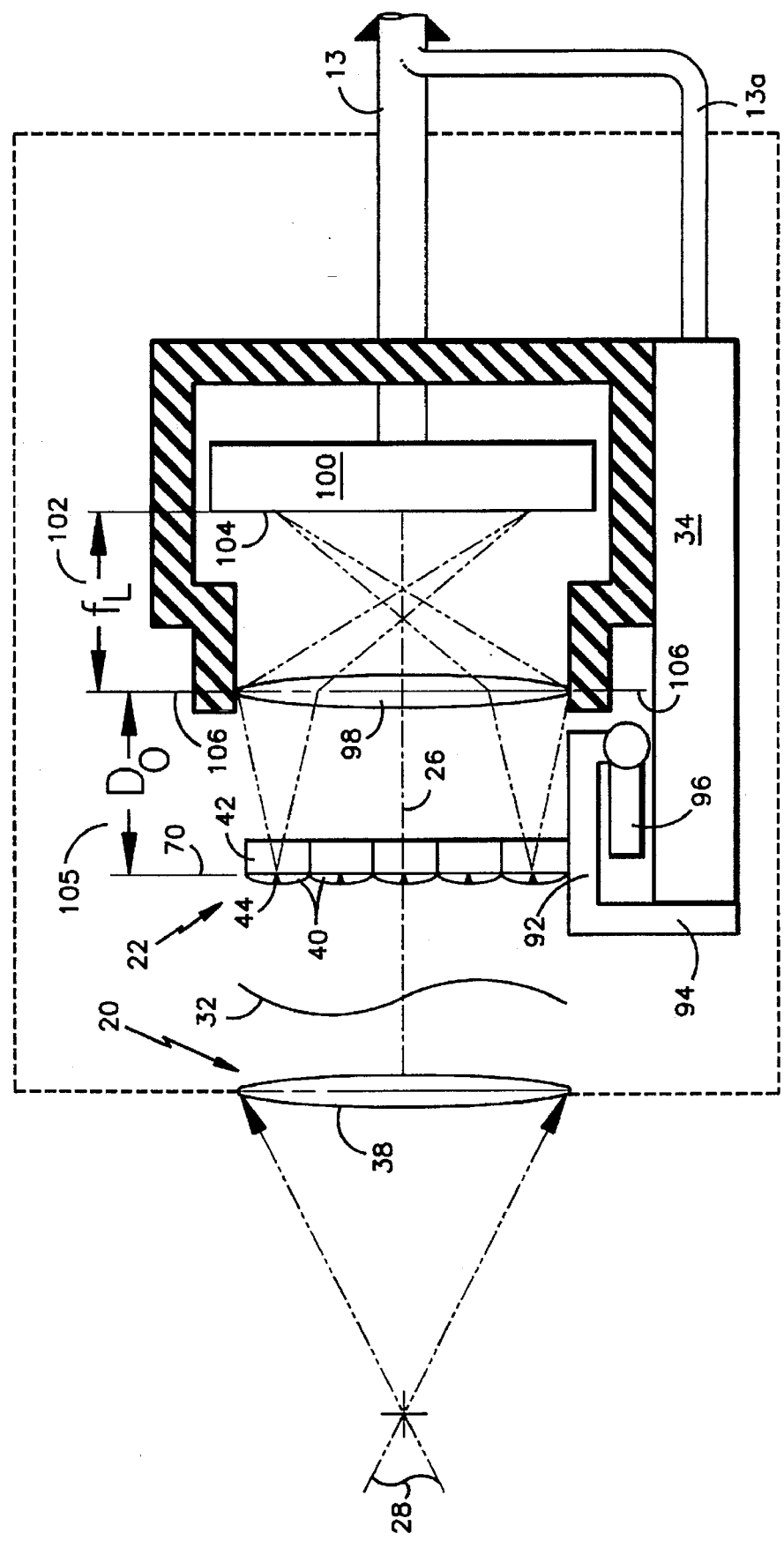
FIG. 9, is a schematic block diagram illustrating an operating feature of the embodiment of FIG. 4.

With the second stop engaged, the pupil plane 106 of the lens 98 is positioned at its object distance $D_o$ from the MLM focal plane 77 such that the focal plane array of spots is imaged on the detector surface 104. In this position the sensor 12 is operating in its normal measurement mode. With the second stop 96 disengaged, platform 34 is moved forward toward the MLM 22 until the platform comes to rest against the first stop 94 as shown in FIG. 9. This positions the entrance pupil 106 of the camera at a distance $D_o$ from the pupil plane 70 of the MLM array 22, such that the array of lenslets and their fiducial elements are imaged onto the detector array. In this position the sensor is operating in its calibration mode.

In the calibration mode the array of fiducial marks appears at the detector surface 104 as an array of spots exactly co-aligned with the centers of each lens. The centroid of each spot is then used to develop a look-up table which is used in precisely the same way as the table generated using a laser reference system. By incorporating the fiducials in the substance of the lenses themselves, the resulting calibration approach is far less expensive and far more stable than is the use of the laser plane wave generator.

Such a system also permits the lens array, mount and mechanical stop assembly to be configured as a replaceable module in the sensor system, so that arrays having different numbers and patterns of lenses, as well as different focal lengths can be inserted to give the sensor different properties. Calibration of the sensor would be ensured by accurate fabrication of the fiducials and the locations of the mechanical stops on each new assembly. Other information (such as lenslet pattern and focal length) which should be communicated to the wavefront sensor processor to configure the software to accommodate the replacement assembly can easily be incorporated in a digital data file created at the time of lens assembly manufacture, and included with the assembly on some transportable medium such as a floppy disk.

The accuracy with which the integral geometric references (IGR) can be used depends on the systematic error sources present in the sensor design. The major sources are:

1) Aberrations in the input optics (or foreoptics) coupling the input beam to the MLM.

2) Variations in the locations of the individual lenslets from a perfect regular array.

3) Time-varying changes in the MLM dimensions and focal lengths due to environment (temperature, vibration, etc.).

4) Variations in the image transfer optics between the MLM and the camera focal plane, 5) Detector plane non-uniformity and time variance.

6) Electronic drifts, etc. in signal acquisition paths (especially in multi-tab, parallel channel detectors).

Of the listed errors, all but the Source 1 errors associated with aberrations in the foreoptics may be corrected with an IGR system. These Source 1 errors must either be designed out of the system or calibrated by other means. This is very practicable in many applications.

The Source 2 error is completely corrected by the IGR which maintains an accurate, constant relationship between the fiducial position and the lenslet hue optical axis (chief ray location), since the position of the lenslet is given by the position of the fiducial to within a constant term which is equivalent to full aperture tilt.

The Source 3 error is very small because of the stability inherent in the MLM fabrication approach described. In this case, the IGR model sensor corrects for lateral dimensional variations, but not focal length changes.

The IGR technique corrects for the most important error terms involving the listed Sources 5 and 6. It does this as accurately as the corrections performed using the prior art reference laser plane wave methods. Similarly the errors of Source 4 is also corrected, with the proviso that care must be taken to design the relay optics such that the magnification change between the MLM pupil plane 70 and its focal plane 77 is small, or at least well-characterized.

The IGR geometric sensor of the present invention provides a measurement accuracy that favorably compares with that provided by prior art geometric sensors, but at a substantially reduced sensor cost due to elimination of the reference wave source and calibration optics. Similarly, the simplicity of the IGR sensor configuration permits its greater tolerance to environmental field conditions, and allows the sensor to be used in a greater number of practical applications.

Although the invention has been shown and described with respect to a best mode embodiment thereof, it should be understood by those skilled in the art that various changes, omissions, and additions may be made to the form and detail of the disclosed embodiment without departing from the spirit and scope of the invention as recited in the following claims.

I claim:

1. A geometric wavefront sensor, for use in a system of the type having a signal processor for determining the phase gradient of a received full aperture wavefront as the aggregate of the difference coordinate position between two dimensional spot images of the received wavefront and a reference wavefront in each of a plurality of subapertures, the sensor comprising:

a monolithic lens module (MLM), having a plurality of subaperture lenses arrayed in a MLM pupil plane for dividing the received full aperture wavefront into plural subaperture images and for focusing each as a two dimensional spot image in a MLM focal plane located on the subaperture beam path at a MLM focal length from said MLM pupil plane; and camera means, for providing an electrical signal equivalent of each of said subaperture spot images to the signal processor;

as characterized by:

each said subaperture lens having an integral geometric reference (IGR) disposed thereon in the form of a substantially opaque center portion concentric with a lens optical axis, at the location of the lens chief ray, each said IGR identifying its associated subaperture lens with an IGR spot image equivalent of a reference plane wave in said MLM pupil plane; and said camera means providing electrical signal equivalents of said subaperture spot and, alternately, each of said IGR spot images to the signal processor which determines therefrom the phase gradient of the received full aperture wavefront as the aggregate of the difference coordinate positions in the subaperture spot image and the IGR spot image from each said subaperture lens.

2. The sensor of claim 1, wherein said camera means comprises:

relay lens, having an optical axis, and having a lens object distance and a lens focal length;

detector means, adapted to be mounted coaxial with said optic axis and relatively spaced at said lens focal length distance from said relay lens; and platform means, adapted for reciprocal movement along said subaperture beam path, and adapted to receive said relay lens and said detector means in combination, in a mounting relationship which positions said optical axis substantially parallel to said subaperture beam path, said platform means being movable along said subaperture beam path to position said relay lens at said lens object distance from said MLM focal plane and, alternately, from said MLM pupil plane, to cause said relay lens to relay said subaperture spot pattern images and, alternately, said IGR spot pattern images to said detector means, said detector means alternately providing electrical signal equivalents of each type of said spot pattern images to said signal processor.

3. The sensor of claim 3, wherein said camera means further comprises:

positioning means, adapted to guide reciprocal movement of said platform means along said subaperture beam path, for positioning said platform means at a first stop position to locate said relay lens at said lens object distance from said MLM focal plane and, alternately, for positioning said platform means at a second stop position to locate said relay lens at said lens object distance from said MLM pupil plane, each in response to operator control.

* * * * *